No. 880,752. PATENTED MAR. 3, 1908.
J. PATTEN & C. R. BARNETT.
PROCESS OF TREATING ORES.
APPLICATION FILED OCT. 31, 1907.
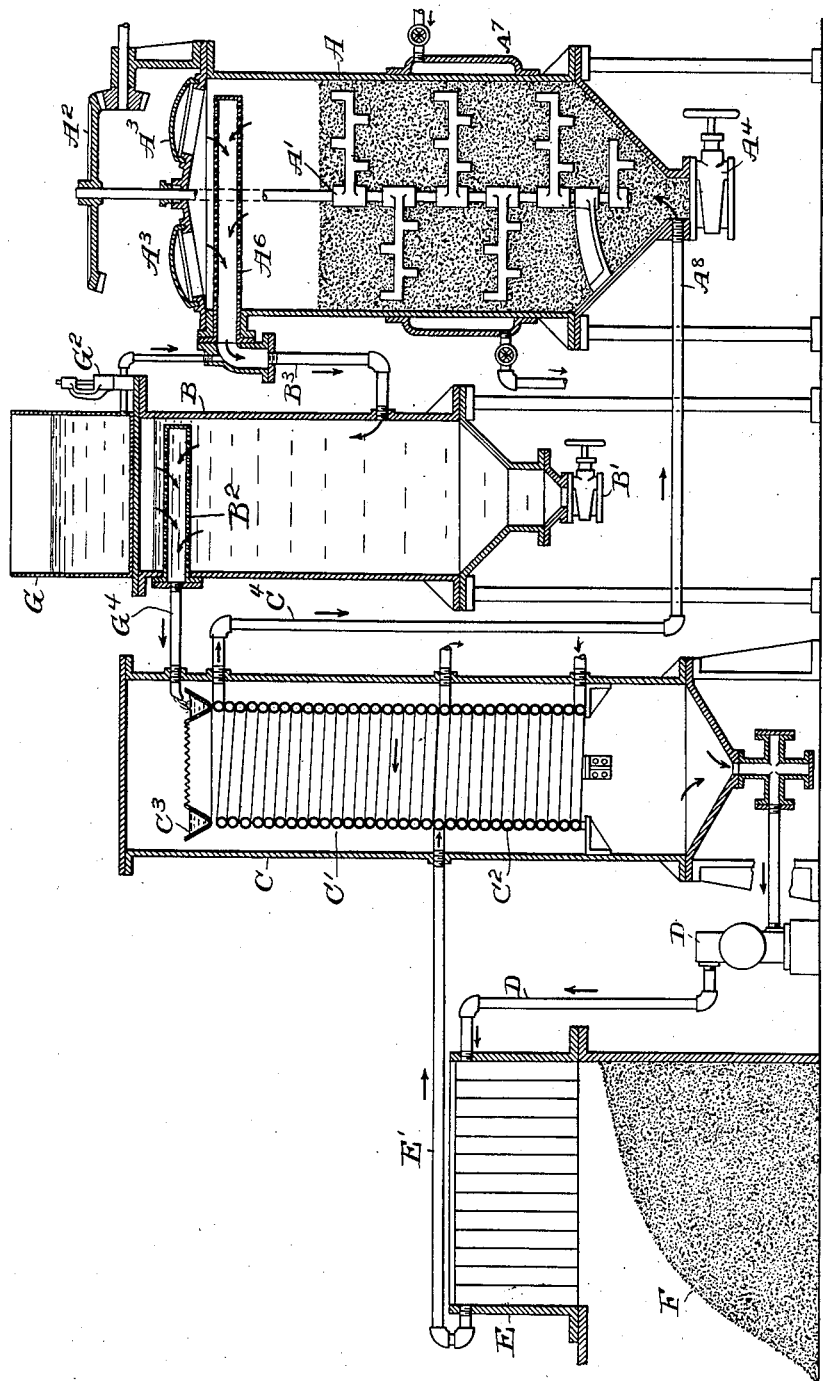
Witnesses
H. V. Hahn
G. F. Downing
Inventors
J. Patten and
C. R. Barnett
By H. A. Seymour, Attorney

UNITED STATES PATENT OFFICE.

JOHN PATTEN AND CHARLES R. BARNETT, OF BALTIMORE, MARYLAND.

PROCESS OF TREATING ORES.

No. 880,752.　　　Specification of Letters Patent.　　　Patented March 3, 1908.

Application filed October 31, 1907. Serial No. 400,135.

*To all whom it may concern:*

Be it known that we, JOHN PATTEN and CHARLES R. BARNETT, of Baltimore, in the county of Baltimore and State of Maryland, have invented certain new and useful Improvements in Processes for Treating Ores; and we do hereby declare the following to be a full, clear, and exact description of the invention, such as will enable others skilled in the art to which it appertains to make and use the same.

This invention relates to processes for treating ores, and more particularly to an improved process for separating sulfid of antimony from antimonial ores.

The object of our invention is to provide a practical process for leaching the sulfid of antimony (stibnite) from what is known as low grade ores and recovering the sulfid of antimony in the form of a hydrated sulfid of antimony which will afterwards be put through other processes for drying it and producing the metallic antimony.

Experience has shown that antimony is a more difficult metal to reduce from its ores than most other base metals and the present methods of smelting it are not adapted for working low grade ores; that is, ore containing from twenty-five to thirty per cent. antimony is not profitable to smelt by the process now in general use, and consequently high grade ores containing over fifty per cent. antimony is sought and when it is mixed with silicious matter the stibnite is separated by liquation. That is to say; the lumps of ore are heated to a dull red heat which melts the stibnite and causes it to run into another vessel, producing what is known as crude antimony, which is almost pure sulfid of antimony, and this is then smelted by the usual methods. An ore containing from five to twenty per cent. antimony distributed through the ore cannot be separated in that way. If the ore be pulverized and heated, the stibnite and silicious matter will fuse together and no sulfid of antimony would run off. We therefore propose to dissolve the stibnite out of the ore and then precipitate it as a stibnite or sulfid of antimony sufficiently pure to smelt for the recovery of the metal.

In carrying out our process we use a sulfid of one of the alkali metals or earths, preferably, the sulfid of sodium, though the sulfid of potassium will answer, but the mono-sulfid of calcium is not sufficiently soluble for use in our process. We can use the penta-sulfid of calcium but as stated above we prefer sodium sulfid and to this we will refer in describing the process.

In carrying out our process, we use continuously a sulfid of soda solution which passes through a cycle of operations without being decomposed. We depend upon the fact that antimony sulfid is more soluble in a hot solution of sodium sulfid than it is in a cold solution, so we pass a current of hot sodium sulfid through a tank containing crushed antimonial ore which saturates the solution with sulfid of antimony. Sometimes arsenic will be present and will be extracted in the same way and sometimes the solution will take up a little silicious matter. We separate these from the solution by feeding a little milk of lime into the hot liquor as it leaves the digesting pan. The lime compounds form insoluble precipitates which either settle to the bottom or are filtered out. The hot liquor is then cooled approximately to normal temperature, which precipitates a large part of the sulfid of antimony in the form of a hydrated sulfid of antimony, which is either allowed to settle to the bottom of the tank or is filtered out, and the effluent liquor returned to the digesting vat to be sued over again as previously described. The hot liquor going one way passes through a heat exchanger in which the cold liquor is traveling the other way, thereby heating the cold liquor and cooling the hot by a simple exchange of heat. The hot liquor is then cooled further (by circulating water) before it is filtered.

Our process can be better understood by referring to the accompanying drawing in which A represents a digesting tank; B a liming tank; C a heat exchanger; D a circulating pump; E a filter press, and F a collecting tank. The digesting tank A is provided with an agitator $A^1$ operated by the gear $A^2$, and said tank is provided with a manhole $A^3$ for charging it with crushed ore, and with the valve $A^4$ for dumping out the waste, after the antimony has been extracted. A filtering tube $A^6$ is interposed in the upper portion of the tank to prevent the pulverized ore from passing out with the hot liquor. The tank B is provided with a dumping valve B¹, and filtering tube B². The heat exchanger C is provided with the heat exchanger coil C¹; a cooling coil C², and distributing trough C³. The pump D and filter press E are of usual construction.

The operation is as follows: After the apparatus has been charged with ore and sodium sulfid as described, the pump D causes the liquor to circulate in the direction indicated by the arrows. The liquor enters the bottom of the digester A through the pipe A⁸ and percolates through the pulverized ore, which is occasionally stirred by the agitator A¹ dissolving as much antimony sulfid as it is capable of holding in solution at that temperature, and it is kept hot by the steam jacket A⁷. It then passes through the filter tube A⁶ and out through the pipe B³ into the liming tank B and at the same time, a pump G² feeds a small quantity of lime water or milk of lime into said tank B, from a tank G. Caustic lime does not decompose or react with a solution of sodium sulfid and antimony sulfid, dissolved in same, but it will react with a great many impurities forming insoluble precipitates which are precipitated in the tank B, and occasionally blown out through the valve B¹. Sometimes they are flocculent and do not settle readily, and must be filtered out by the filtering tube B² or any other form of filter. Sometimes the lime will be fed in with the ore and the insoluble lime compounds formed dumped out with the waste. The purified hot saturated liquid passes out through the pipe 64 into the heat exchanger C, first entering the distributing trough C³ and trickles down the outside of the heat exchanger coil C¹. This coil contains the cold liquor running in the opposite direction, so that the saturated liquor is cooled as it descends, at the same time precipitating a part of the antimony sulfid which is a loose flocculent precipitate which washes down with the liquor. After the liquor leaves the coil C¹, although it has been cooled considerably it is still warm and is further cooled by the coil C² which has cooling water circulating through it. The cold saturated liquor mixed with the precipitate runs to the bottom of the tank C and into the pump D and is forced through the pipe D¹ into the filter E, which is of ordinary construction. The clear liquor which emerges from the filter passes through the pipe E¹ into the lower end of the coil C¹ then down through the pipe C⁴, after having been heated by the heat exchanger. It then enters the digester as before and passes through the same cycle of operation, the digester being kept hot by the steam jacket A⁷. When the filter press E becomes filled with the precipitate, clear water is fed to the pump D, which latter forces such clean water through the precipitate, thereby washing it. The filter press is then opened and the antimony sulfid is dumped to the tank below, after which it will be dried for further use. After the antimony sulfid is extracted from the digester, the valve A⁴ will be opened (after having removed the solution) and the waste from the ore dumped out. A new charge of ore will then be inserted and the antimony extracted as previously described. When we are working on a large scale, we will employ several of these digesters and work them in tandem in such a way that the weak liquor will first enter the tank from which the most of the antimony has been extracted, then travel to the next and end with fresh ore. The different digesters will be provided with pipes, valves &c., so that one of them can be cut out and recharged without interfering with the operation of the others.

Having fully described our invention what we claim as new and desire to secure by Letters-Patent, is,—

1. A process for separating antimony sulfid from antimonial ores, consisting in circulating a solution of sodium sulfid through hot ores, then cooling the solution, causing a portion of the dissolved antimonial sulfid to precipitate, then separating the precipitated antimonial sulfid from the solution, then heating the solution again running it through the hot ore again, substantially as described.

2. A process for separating the sulfid of antimony from the antimonial ores with a solvent sulfid solution consisting in alternately heating the solution, bringing the hot solution in contact with the crushed ore, cooling the saturated solution to precipitate a part of the dissolved antimony, separating the precipitant, heating the clarified solution again and using it over again.

3. A process for separating the sulfid of antimony from the antimonial ores with a solvent sulfid solution consisting in alternately heating the solution, bringing the hot solution in contact with the crushed ore adding lime during the process for uniting the dissolved silica, arsenic and other compounds forming the insoluble compounds to eliminate them from the solution, cooling the saturated solution to precipitate a part of the dissolved antimony, separating the precipitant, and heating the clarified solution again and using it over again.

4. A process for separating antimony sulfid from antimonial ores, which consists in treating the ore with a solvent sulfid solution in the presence of heat, subsequently cooling the resulting solution to precipitate antimonial sulfid, then filtering to recover the antimonial sulfid, and then subjecting ore to the resultant solution in the presence of heat.

5. A process for separating antimonial sulfid from antimonial ores, consisting in passing a solvent sulfid solution through said ores in the presence of heat, subjecting the resultant solution to a cooling medium consisting of a previously cooled portion of solution from which the antimonial sulfid has been removed.

6. A process for separating antimonial sulfid from antimonial ores, consisting in treating a mass of such ore with a solvent sulfid solution, filtering the resultant solution, utilizing the filtered solution to absorb heat from that portion of the solution passing from the mass of ore, and then conducting the solution thus heated to the mass of ore.

7. A process for separating antimonial sulfid from antimonial ore, consisting in subjecting a mass of such ore to the action of a solvent sulfid solution in the presence of heat, cooling the resultant solution, filtering the solution now containing antimonial precipitate, and subsequently heating the resultant solution, and conducting it to the ore.

8. A process for separating antimonial sulfid from antimonial ore, consisting in passing a solvent sulfid solution through such ore, in the presence of heat, subjecting the resultant solution to a liming action, cooling the solution, filtering the solution, now containing antimonial precipitate, and returning the resultant solution to the ore.

9. A process for separating antimonial sulfid from antimonial ores, consisting in passing a solvent sulfid solution through such ore, in the presence of heat, subjecting the resultant solution to a cooling action, filtering the solution, utilizing the resultant solution for cooling solution flowing from the ore and then returning the filtered solution to the ore.

10. A process for separating antimonial sulfid from antimonial ores, consisting in subjecting a mass of such ore to the action of a solvent sulfid solution in the presence of heat, cooling the resultant solution, and then filtering the cooled solution.

11. A process for separating antimonial sulfid from antimonial ore, consisting in passing through a mass of such ore, a solvent sulfid solution in the presence of heat, agitating the mass of ore, subjecting the resultant solution to a liming action and then cooling it, and then filtering the cooled solution to recover the antimonial sulfid precipitate.

12. A process for separating antimonial sulfid from antimonial ore, consisting in passing a solvent sulfid solution through a mass of such ore in the presence of heat, alternately cooling and heating the solution passing from the ore, filtering the cooled solution, and returning the heated solution to the ore.

In testimony whereof, we have signed this specification in the presence of two subscribing witnesses.

JOHN PATTEN.
C. R. BARNETT.

Witnesses:
LEWIS N. HOPKINS Jr.,
JOS. T. BYRNE.